March 16, 1937.  J. A. SANDER  2,073,947
PORTABLE SECTIONAL FENCE
Filed June 19, 1935
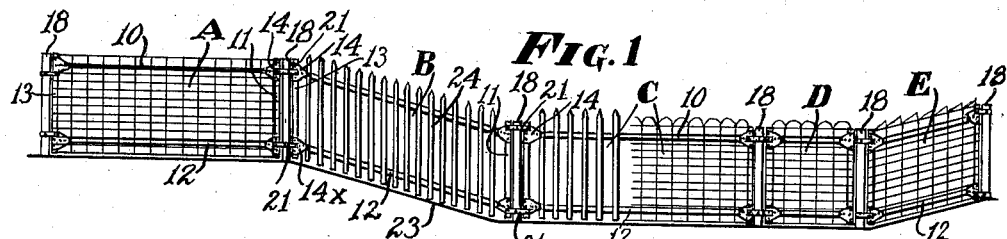
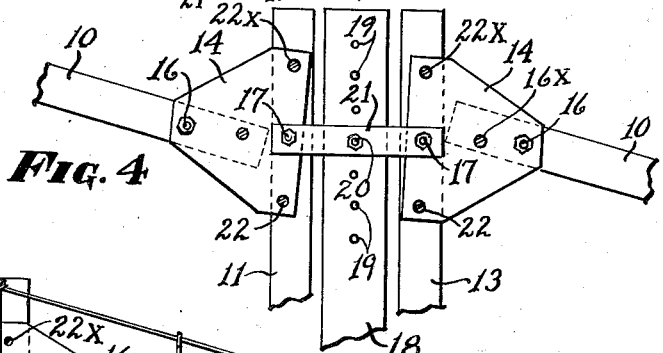
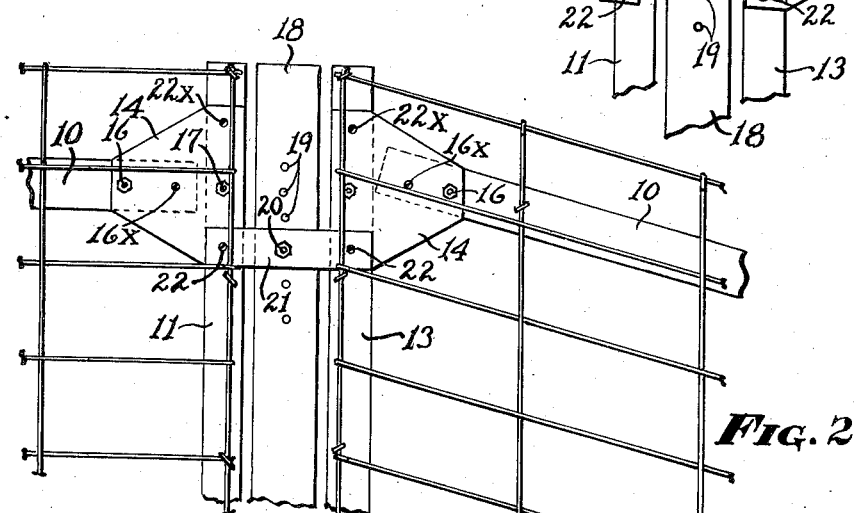
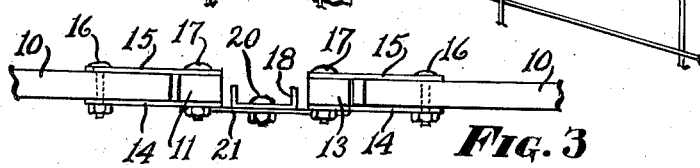
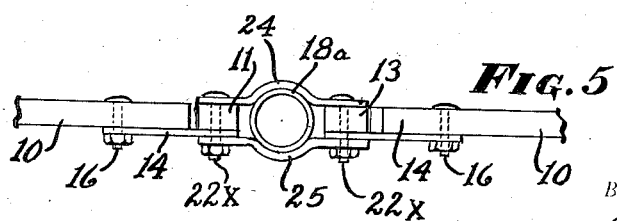
INVENTOR.
John A. Sander
BY
Edwards & Charles
ATTORNEY.

Patented Mar. 16, 1937

2,073,947

UNITED STATES PATENT OFFICE 2,073,947

PORTABLE SECTIONAL FENCE

John A. Sander, Wichita, Kans.

Application June 19, 1935, Serial No. 27,394

2 Claims. (Cl. 256—24)

My invention relates to a portable sectional fence. The object of my invention is to provide a fence which is made in sections so that the fence may be easily set up or taken down or so that it can be removed for resetting without loss of any part of the fence.

A further object is to provide a fence of the kind mentioned, the sections of which are adjustable so that in case the ground where the fence is to be placed is not level, the sections of the fence may be adjusted to fit the contour of the ground.

A still further object is to provide a fence of the kind mentioned, the sections of which are small enough that they may be painted by dipping the sections in paint instead of putting the paint on with a brush.

Another object is to provide a fence of the kind mentioned that is adapted to receive numerous kinds of fencing materials, such as paling, woven wire, ornamental wire, etc.

These and other objects will be more fully described as this description progresses.

In the drawing, Fig. 1 is a side view of several sections of different types of fencing that may be employed and also illustrating how the fence can be adjusted to conform to the contour of the ground.

Fig. 2 is an enlarged detail side view of the ends of two sections of the fencing showing the method of supporting the sections and the method of making the adjustments previously mentioned.

Fig. 3 is a plan view of Fig. 2.

Fig. 4 is a detail side view of the adjusting mechanism, showing further combinations of adjustment.

Fig. 5 is a plan view of a modified form of the invention.

Similar numerals of reference refer to the same parts throughout the several figures.

Referring to the drawing; the invention comprises a fence composed of a plurality of adjustable sections, such as A, B, C, D, and E; arranged in an end to end relationship; each section being composed of a frame 10, 11, 12, and 13 which form a parallelogram, the corners of which are joined by paired gusset plates 14 and 15 as shown in Fig. 3 or by single gusset plates 14 as shown in Fig. 5. These gusset plates are provided with holes at the points 16, 16x, 17, 22 and 22x. Bolts 16 and 17 pass through said gusset plates and frame members of the parallelogram adjacent thereto in such a manner as to form pivot points at the corners of the parallelogram or so that the ends of the parallelogram may be raised or lowered with respect to each other, the side and end members of the parallelograms will still cover the remaining holes in the gusset plates. The parallelogram may be in the form of a rectangle as shown at A in Fig. 1, or it may be a parallelogram whose angles are acute or obtuse as shown at B or E in Fig. 1. These features are also illustrated in Figs. 2 and 4.

After the parallelograms have been set in the desired position, screws or bolts 22 and 22x and 16x may be passed through holes in the plates 14 and 15 and into and through the members 10, 11, 12, or 13, to permanently secure the parallelogram in its adjusted position.

Intermediate adjacent sections of the fence are shown posts 18, having holes 19 therein to pass a bolt 20 which rigidly supports a cross tie element 21 on the post 18. The outer ends of the element 21 are provided with holes to receive bolts or screws 22 which pass through the element 21 and into or through the adjacent elements 11 or 13 as a means of attaching the fence sections on the supporting post 18.

If the contour of the ground where the fence is to be built is not level, one end of the fence section B may be attached to the post as illustrated at 14 and 14x in Fig. 1, while the opposite end of the fence section may be dropped to any desired angle or so as to correspond to the slope of the ground line 23, whereupon the opposite end of such fence section may be attached to a second post 18 as shown.

As illustrated in sections A, C, D, and E in Fig. 1 and also in Fig. 2, the vertical ends 11 and 13 of the parallelograms support wire fencing material, which, when the parallelogram assumes an angle as shown in section E of Fig. 1, the wire mesh will give or bend to conform to the changed shape of the parallelogram. As shown in section B of Fig. 1, palings 24, attached to the parallel elements 10 and 12 of the parallelogram, are used instead of wire mesh and the section may assume an inclined position and the palings still retain their vertical position.

As shown in Figs. 3 and 4, the post 18 is a metal channel element. It will be understood that a wooden post may be substituted for the metal channel if so desired.

In Fig. 5 is shown a modified form of construction in which the post 18a is a pipe or round post and the side and end members of the parallelogram are joined by a single gusset plate 14, the gusset plate 15 as shown in Fig. 3 being omitted. Clamp elements 24 and 25 are positioned on either side of the post 18a and the ends thereof overlap the adjacent end elements of the gusset plates on the parallelograms, while bolts 22x pass through the clamp elements and the assembly of the parallelogram to secure the fence sections to the post 18a.

Such modifications may be employed as lie within the scope of the appended claims without departing from the spirit and intention of my invention. Now having fully described my invention, what I claim as new, and desire to secure by Letters Patent is:

1. A portable fence section, said section comprising a parallelogram frame having fencing material thereon, the corners of said frame being held together by gusset plates, said gusset plates having holes therein and being pivotally affixed to the adjacent members of said frame so as to permit the adjustment of said frame and gusset plates so that after the frame has been adjusted, the gusset plates may be adjusted so that the holes therein will be covered by the frame elements so that binding elements may be passed through said holes into or through said frame elements to rigidly bind and hold said frame in its adjusted position.

2. A fence, said fence comprising portable sections supported on posts, each section comprising a parallelogram frame having fencing material thereon, the corners of said frame being held together by gusset plates, said gusset plates having holes therein and being pivotally affixed to the adjacent members of the parallelogram frame to permit the adjustment of said frame and gusset plates so that after the frame has been adjusted, the gusset plates may be adjusted so that the holes therein will be covered by the frame elements so that binding elements may be passed into or through the frame elements to bind and hold the frame elements in their adjusted positions.

JOHN A. SANDER.